United States Patent [19]

Lavanish et al.

[11] 4,039,623

[45] Aug. 2, 1977

[54] CATALYTIC OXIDATION OF C2-C4 HALOGENATED HYDROCARBONS

[75] Inventors: Jerome M. Lavanish, Akron; Edward J. Sare, Clinton, both of Ohio

[73] Assignee: PPG Industries, Inc., Pittsburgh, Pa.

[21] Appl. No.: 714,889

[22] Filed: Aug. 16, 1976

[51] Int. Cl.$^2$ .............................................. B01D 53/34
[52] U.S. Cl. .................................. 423/240; 423/245; 423/481
[58] Field of Search ............... 423/240, 241, 481, 488, 423/489, 490, 245, 502

[56] References Cited

U.S. PATENT DOCUMENTS

| 3,453,073 | 7/1969 | Sims | 423/481 |
|---|---|---|---|
| 3,705,010 | 12/1972 | Davis et al. | 423/502 |
| 3,845,191 | 10/1974 | Bruce | 423/240 |
| 3,972,979 | 8/1976 | Kageyama | 423/240 |

*Primary Examiner*—Earl C. Thomas
*Attorney, Agent, or Firm*—Irwin M. Stein

[57] ABSTRACT

$C_2$-$C_4$ halogenated hydrocarbons, e.g., chlorinated and brominated hydrocarbons such as vinyl chloride, present in a gas stream are removed therefrom, e.g., incinerated, by contacting the gas stream with an oxygen-containing gas in the presence of hydrated nickel oxide catalyst at relatively low temperatures, e.g., 20°-500° C. Commonly, the halogenated hydrocarbon is present in the gas stream in small amounts, e.g., less than 0.05 weight percent. The temperature of incineration is adjusted within the range of 20°-500° C. depending on the relative humidity of the gas stream to maintain catalytic activity.

15 Claims, No Drawings

CATALYTIC OXIDATION OF C2-C4 HALOGENATED HYDROCARBONS

DESCRIPTION OF THE INVENTION $C_2$-$C_4$ halogenated hydrocarbons, e.g., chlorinated and brominated hydrocarbons containing two carbon atoms, are used commercially in many applications. For example, vinyl chloride and vinylidene chloride are used to prepare useful polymers and copolymers. Other chlorinated $C_2$-hydrocarbons, such as methylchloroform (1,1,1-trichloroethane), and trichloroethylene are useful as solvents and are employed in metal degreasing. Ethylene dichloride and ethylene dibromide are used in gasoline as part of lead anti-knock formulations.

Recently, vinyl chloride has been reported to be a suspected carcinogen and consequently human exposure levels have been severely restricted. In areas where vinyl chloride is made or used, e.g., polymerized, gas process streams may be produced containing relatively small but still objectionable quantities of vinyl chloride which cannot be recovered economically. Such process streams may include vents connected to process equipment, such as reactor stripper, condenser and drier vents, storage vessel vents, and area vents, e.g., reactor building vents. Thus, a need exists for a method for destroying or reducing significantly the vinyl chloride content of such gas streams. A similar need may exist for gas process streams containing other $C_2$ halogenated hydrocarbons, and $C_3$ and $C_4$ halogenated hydrocarbons.

It has been reported that certain halogenated hydrcarbons such as methylchloroform, vinylidene chloride, trichloroethene, tetrachloroethene, and chloroform are susceptible in varying degrees to Hopcalite-catalyzed decomposition with humidified air (about 50 percent relative humidity) at temperatures in excess of 300° C., e.g., 305° C.-415° C. See, for example, the articles "Catalytic Combustion of Atmospheric Contaminants Over Hopcalite" by J. G. Christian et al, Int. J. Air Wat. Poll., Pergamon Press 1965, Vol. 9, pp. 1-10, and "Catalytic Decomposition of Halogenated Hydrocarbons over Hopcalite Catalyst" by J. K. Musick et al, Ind. Eng. Chem., Prod. Res. Develop., Vol. 13, No. 3, 1974, pp. 175-179.

It has now been discovered that the $C_2$-$C_4$ halogenated hydrocarbon, e.g., $C_2$-chlorinated and brominated hydrocarbon, content of gas streams, e.g., air streams, containing same, can be reduced by contacting such halogenated hydrocarbon with oxygen-containing gas in the presence of hydrated nickel oxide catalyst at relatively low incineration temperatures, e.g., 20°-500° C. In particular, it has been found that $C_2$-chlorinated hydrcarbons, such as vinyl chloride, vinylidene chloride and methyl chloroform can be incinerated at relatively mild temperatures, e.g., 50° C.-300° C. in the presence of hydrated nickel oxide catalyst. The temperature of incineration is adjusted within the range 20°-500° C. depending on the relative humidity of the gas streams in contact with the catalyst, i.e., the relative humidity of the incineration zone. Under conditions of low relative humidity, e.g., less than 5 percent (measured at 23° C.) temperatures on the low side of the aforesaid range, e.g., 20° C.-110° C. can be used. For example, at an incineration temperature of 104° C. and a relative humidity of 2 percent or less, it has been found that the vinyl chloride content of a synthetic air gas stream can be reduced substantially, i.e., reduced at least 70, e.g., 80, percent; and the vinylidene chloride content of such gas stream reduced to non-detectable levels, i.e., less than 0.2 parts per million parts of the gas stream (ppm).

DETAILED DESCRIPTION $C_2$-$C_4$ halogenated hydrocarbons to which the process of the present invention can be applied are chlorinated and brominated saturated and unsaturated hydrocarbon compounds containing two to four carbon atoms and from 1 to 4, preferably 1 to 3, halogen (chlorine or bromine) atoms per molecule. Examples of such halogenated hydrocarbons include vinyl chloride, vinylidene chloride, methyl chloroform (1,1,1-trichloroethane), 1,1,2-trichloroethane and trichloroethylene, perchloroethylene, vinyl bromide, vinylidene bromide, dichloroethane, ethylene dichloride, ethylene dibromide, propyl chloride, propyl bromide, isopropyl chloride, 1-,2-, and 3-chloro-propene, 1,2- and 2,3-dichloropropene, allyl chloride, epichlorohydrin, chloroprene and butylene dichloride, etc. Preferably the ratio of hydrogen to halogen (chlorine or bromine) atoms in the halogenated hydrocarbon is at least one. The process described herein is deemed particularly applicable to unsaturated $C_2$-chlorinated hydrcarbons, i.e., vinyl compounds, incompletely halogenated derivatives of ethylene and methyl chloroform.

As the nickel oxide used to catalyze the incineration of the aforementioned halogenated hydrocarbons, there can be mentioned nickel in the II, III, and IV oxidation states, e.g., nickel (II) oxide (NiO), and mixtures of such oxides, i.e., nickel (II, III) oxide ($Ni_2O_3 \cdot H_2O$) which is reported to be NiO (OH). Preferably nickel oxide in a mixed oxidation state, e.g., nickel (II, III) oxide ($Ni_2O_3 \cdot H_2O$) is used. The term "nickel oxide", as used in this specification and claims, (unless otherwise indicated) is intended to mean and include any one of the aforementioned nickel oxides or combinations of such oxides.

The nickel oxide content of the active portion of the catalyst is typically at least 70 or 75 weight percent, disregarding catalyst supports, preferably at least 80, e.g., 85 weight percent. The remainder of the active catalyst can be minor amounts of other metal compounds, e.g., metal oxide impurities, that do not interfere significantly with the catalytic function of the catalyst, and water of hydration. Metal oxide impurities can be incorporated during preparation of the catalyst or be present in the reactants used to prepare the catalyst.

It is believed from the evidence at hand that some water of hydration associated with the nickel oxide catalyst is beneficial, vis a vis, the catalytic activity of the nickel oxide for the incineration of the $C_2$-$C_4$ halogenated hydrocarbons. For example, it has been observed that a nickel (II) oxide catalyst which had little, if any, water of hydration was catalytically inactive, while a nickel (II) oxide catalyst having significant water of hydration was catalytically active. The presence or absence of water of hydration is related to the temperature seen by the surface of the metal oxide catalyst during its preparation or use. For example, nickel oxide prepared by thermal decomposition of a nickel salt at temperatures greater than 500° C., e.g., 530° C. can have little water of hydration associated with the metal oxide and hence would be expected to have little catalytic activity at the lower temperatures utilized in the present process.

The total quantity of water associated with the nickel oxide as water of hydration can vary depending on the particular nickel oxide or mixture of nickel oxides used, and the method of nickel oxide preparation. In particular, the drying conditions used in the nickel oxide preparation can vary and thereby effect the amount of water of hydration present. It has been found that a nickel oxide catalyst having water of hydration in an amount at least as high as that obtained by drying an aqueous filter cake of precipitated nickel hydroxide at 225° C. for a time sufficient to reach equilibrium yields a nickel oxide catalyst having an adequate level of water of hydration. Such a temperature is sufficient to remove substantially all of the phase water present in the filter cake without excessive loss of water of hydration. Lower temperatures, e.g., $\leq 200°$ C., sometimes require extended drying times to permit conversion of the hydroxide to the oxide. Higher drying temperatures can be used; however, care should be exercised when using higher temperatures to prevent complete loss of the water of hydration and the consequent reduction in catalyst activity. Temperatures well in exesss of 250° C., e.g., 350°–450° C. are not recommended for drying for the aforesaid reason.

The sufficiency of the water of hydration level of the nickel oxide catalyst used can be determined best by utilizing the nickel oxide as an incineration catalyst, e.g., a vinyl chloride incineration catalyst, and observing the catalyst activity, i.e., the loss in halogenated hydrocarbon, a simple expedient for one skilled in the art. As used herein, hydrated nickel oxide catalysts are those that are capable of removing at least 70, e.g., 80, percent of vinyl chloride from an air stream containing about 40 ppm vinyl chloride under conditions of less than one percent relative humidity (measured at 23° C.), a reactor temperature of 104° C., a gas flow rate of 9 liters per hour, a catalyst bed L/D ratio (depth of catalyst bed/diameter of catalyst bed) of at least two, and an average residence time in contact with the catalyst of 10 seconds. The average residence time is the value obtained by dividing the volume of catalyst by the volumetric rate of flow through the catalyst. Preferably, at least 90 percent and most preferably 100 percent of the vinyl chloride is removed from the air stream under such conditions.

The nickel oxide catalyst can be used in an unsupported form or can be supported on an inert substrate. By "inert" is meant that the substrate is chemically inert to the metal oxide catalyst deposited thereon and chemically resistant to the components of the halogenated hydrocarbon-containing gas stream, e.g., vinyl chloride-containing gas stream, and the oxidation products resulting therefrom. Examples of suitable inert substrates include: asbestos, pumice, activated charcoal, silica gel, colloidal silica, fumed silica, activated alumina, and clays. When used in a supported form, the amount of catalyst placed on the support should be sufficient to catalyze incineration of the $C_2$–$C_4$ halogenated hydrocarbon, i.e., a catalytic amount. The catalytic amount of catalyst placed on a support can be determined by one skilled in the art by routine experimentation.

The nickel oxide catalyst can be prepared in any number of ways well-known to those skilled in the art of catalyst preparation. For example, nickel oxide catalyst can be prepared by precipitating the hydroxide from a solution of a nickel salt(s). The precipitate is then dried to remove phase water and partially dehydrate the hydroxide and form the oxide. Typically, drying is performed at temperatures of from 200°–250° C. When a catalyst support is used, the nickel hydroxide(s) can be precipitated directly onto the support. In addition, the nickel oxides can be prepared by thermal decomposition of other suitable oxygen-containing anion salts of nickel, e.g., nitrate, carbonate and oxalate. Preferably, thermal decomposition should not be conducted at temperatures which dehydrate completely the nickel oxide. The surface area of the nickel oxide catalyst prepared can vary; but, as in most catalyst applications, relatively high surface areas are preferred.

In the event the nickel oxide catalyst becomes deactivated through use (but not permanently poisoned) it is possible to regenerate the catalyst by passing a dehumidified, i.e., less than 5, preferably less than about 2, e.g., less than 1, percent relative humidity (measured at 23° C.), gas stream-containing oxygen, e.g., as provided by air, oxygen, or oxygen-riched air, in intimate contact with the catalyst at elevated temperatures, e.g, about 150° to 200° C., in the substantial absence of contaminating gases, e.g., hydrogen halide (hydrogen chloride) $C_2$–$C_4$ halogenated hydrocarbons (vinyl chloride), and high levels of water vapor. The catalyst is contacted with oxygen for a period of time sufficient to regenerate the catalyst, e.g., from 0.5–10 hours. The exact amount of time will of course be dependent on the amount of catalyst, temperature of treatment, and volumetric rate of low through the catalyst bed.

The process described herein results in the removal of $C_2$–$C_4$ halogenated hydrocarbons, e.g., $C_2$-chlorinated hydrocarbons, from a gas stream containing same. The extent to which the aforesaid halogenated compounds are removed from the gas stream is dependent on the conditions of incineration and the particular compound to be removed. It has been observed that with respect to incineration of unsaturated $C_2$-halogenated hydrocarbons, the nickel oxide catalyst described herein appears to be more active catalytically toward such hydrocarbons that contain 2–3 halogen atoms, e.g., chlorine atoms, per molecule than to other compounds within the group. At temperatures in the range of 50°–100° C., removal appears to be accomplished by several mechanisms, i.e., oxidative decomposition (incineration), adsorption and dehydrochlorination. It is not known for certain at this time to what extent each of the aforesaid mechanisms participates in the removal process. Therefore, the term "incineration", as used herein and in the claims is intended to mean and include oxidative decomposition alone or oxidative decomposition in combination with one or both of the other two aforementioned mechanisms.

In accordance with the present process, $C_2$–$C_4$ halogenated hydrocarbons, e.g., chlorinated hydrocarbons such as vinyl chloride, are catalytically oxidized at temperatures between about 20° C., and about 500° C., e.g., 50°–300° C. At the lower temperatures, e.g., 20° C. – 50° C., within the range, catalytic activity is expected to fall off rapidly with time; however, in applications such as in gas masks, even a few moments of activity can be important. Temperatures between about 80° C., or 100° C. and about 250° C., e.g., between about 100° and 150° C. or 200° C., are deemed to be particularly economically desirable. The use of such fairly moderate temperatures, e.g., temperatures of about 100° C., to achieve incineration of the described halogenated hydrocarbons is surprising since significantly higher temperatures are commonly used to incinerate such materials by a non-catalytic process. Consequently, use of moderate incineration temperatures can represent a significant savings in heat energy. Further, an incineration process that operates at about 100° C. can utilize low pressure waste steam which is readily available in chemical process plants; and, therefore, such process offers significant further economic advantages. Temperatures in the range of about 100°-150° C. or 200° C., are preferred because such temperatures assist in the removal of the products of oxidation, e.g., hydrogen chloride, carbon dioxide and water, from the surface of the catalyst.

The aforesaid temperatures are reactor temperatures as described in the Examples following, i.e, the temperature of the gas stream above the catalyst bed. The temperatures of the catalyst surface are believed slightly higher than the reactor temperature because of the heat of incineration produced by oxidative decomposition of the halogenated hydrocarbons.

The particular incineration temperature selected may depend on the relative humidity of the gas stream entering the reactor containing the nickel oxide catalyst. From the evidence at hand, it appears that water vapor, i.e., the humidity of the gas, tends to diminish the activity of the hydrated nickel oxide catalyst. This lowing of activity is more pronounced at low temperatures, e.g., 20° C.-110° C. Therefore, higher temperatures are required to obtain a particular catalyst activity than when operating with a substantially dry gas, i.e., a gas stream having low relative humidity.

As used herein, the relative humidity of a gas stream is the value reported as measured at room temperature (23° C.) and ambient pressure (745 millimeters of mercury). By low relative humidity is intended to mean less than about 5, e.g., less than 2, percent.

The activity of the nickel oxide catalyst used in the present process can be expressed in terms of its efficiency at the conditions of incineration, i.e., the percent of $C_2$-$C_4$ halogenated hydrocarbon removed from the gas stream after conditions become constant. The efficiency of the catalyst can be determined by the expression:

$$(C_i - C_f) 100/C_i$$

wherein $C_i$ is the initial concentration of the halogenated hydracarbon in the gas stream and $C_f$ is the final concentration. Thus, the higher the efficiency of the catalyst, the higher is its "activity".

As indicated, the extent of inhibition of the activity of the hydrated nickel oxide catalyst by water vapor is temperature dependent. The lower the temperature of incineration, the more pronounced the lowering of catalyst activity. Consequently, for any desired level of catalyst activity, it is possible to either regulate the relative humidity of the gas streams to be treated or the temperatures at which treatment is conducted. Thus, the reactor temperature is maintained at a level within the aforesaid described range to inhibit reduction or loss of the nickel oxide catalyst activity by the moisture content of the gas streams contacting the catalyst. The level of catalyst activity may vary depending on the halogenated hydrocarbon to be removed from the stream, the initial concentration of the halogenated hydrocarbon and the final concentration thereof in the treated stream required by subsequent process treatment, government regulation, etc. It is therefore impossible to set a minimum acceptable level of catalyst activity since such a level is determined by the desires and needs of the operator. However, one skilled in the art, with the information provided herein, can select those operating conditions required to provide the catalyst activity desired.

Generally, the higher the incineration temperature and the lower the relative humidity of the entering gas streams, the higher the catalysts' activity. Therefore, when the amount of heat energy available for incineration or materials of construction limit the incineration temperature to a particular range, the relative humidity of the combined gas streams contacting the catalyst is maintained at a level within said range to maintain catalyst activity at the esired level. On the other hand, if available heat energy or materials of construction do not limit the incineration temperature, the incineration temperature can be adjusted to offset the adverse effect of moisture on the catalyst activity. Thus, within the temperature range of 20° C.-500° C., e.g., 50° C.-300° C., either the temperature of incineration or relative humidity of the treated gas streams or both are regulated or maintained at a level at which the level of catalyst activity remains at the desired level. For example, when the incineration temprature is less than about 110° C. it is expected that the relative humidity will be kept at less than 5 percent, e.g., 2 percent and preferably less than 1 percent.

The above-described effect that water vapor has on the activity of the catalyst can be described as a reversible poisoning or inhibition to distinguish the effect from an irreversible poisoning, such as the effect of sulfur compounds on noble metal catalysts, reaction of the catalyst surface, etc. In those cases, the effect on the catalyst is not generally reversible without reworking the catalyst. As the data presented in the Examples show, the reduced efficiency of the catalyst due to an increase in the level of water vapor in the gas stream is reversed by lowering the relative humidity of the gas stream to its former level.

In one embodiment of the present process, the gas stream to be treated is dehumidified to a desired relative humidity level and then incinerated at temperatures within the range described hereinbefore. The $C_2$-$C_4$ halogenated hydrocarbon-containing gas stream can be dehumidified, if necessary, by passing it through a drying column containing a desiccant. Either solid or liquid desiccants can be used to remove water vapor from the gas stream. Examples include: silica gel, activated alumina, fused anhydrous calcium sulfate, lime, magnesium perchlorate, calcium chloride, potassium hydroxide, sulfuric acid, lithium chloride solutions and ethylene glycol. The drying of gases is well-known in the chemical process industry and the means for achieving such drying is not critical to the practice of the present invention. Use of solid desiccants in gas masks to take up water vapor is well known.

The amount of oxygen used in the oxidation of the $C_2$-$C_4$ halogenated hydrocarbons in accordance with the present process should be an amount that is sufficient to incinerate the $C_2$-$C_4$ halogenated hydrocarbon content of the gas stream, i.e., an incinerating amount. The amount of oxygen should be at least stoichiometrically sufficient to oxidize the carbon content of the halogenated hydrocaron to carbon dioxide and preferably sufficient to oxidize both the carbon content and available hydrogen content of the halogenated hydrocarbon to carbon dioxide and water, respectively. With respect to vinyl chloride, the stoichiometric amount of oxygen is obtained from the following balanced equation:

$$CH_2 = CHCl + 2.5\ O_2 \rightarrow 2CO_2 + H_2O + HCl$$

The calculated heat of reaction for the reaction represented by the reaction of the aforesaid equation is about 270 kilocalories per mole of vinyl chloride.

Generally the amount of oxygen used will be far in excess of the stoichiometric amounts required in order to insure complete oxidative decomposition of the halogenated hydrocarbon compound. The amount of oxygen used is not critical provided that sufficient quantities are made available to accomplish the aforesaid oxidation. The oxygen can be provided by utilizing air, oxygen, or oxygen-enriched air. The oxygen-containing stream, if separate from the $C_2$-$C_4$ halogenated hydrocarbon-containing stream, can also be dehumidified to a low relative humidity before being mixed with the aforesaid halogenated hydrocarbon-containing stream.

In carrying out one embodiment of the process of the present invention, the $C_2$-$C_4$ halogenated hydrocarbon-containing gas stream is dehumidified, if necessary, and mixed with dehumidified oxygen-containing gas (if used) and introduced into a preheater. In the event the $C_2$-$C_4$ halogenated hydrocarbon-containing gas stream is sufficiently dry or already contains sufficient quantities of oxygen, no additional drying or mixing with an oxygen-containing stream is required. This may well be the situation in the latter case where an area in which $C_2$-$C_4$ halogenated hydrocarbon may be present is well ventilated and the exhausted vent gas process stream is to be treated in accordance with the present invention. The dehumidified oxygen-containing process stream that also contains $C_2$-$C_4$ halogenated hydrocarbon is preheated, if necessary, and the heated gas stream introduced into a catalytic reactor in which the hydrated nickel oxide catalyst has been placed, e.g., as a fixed or fluid bed. Preheating should be conducted to the approximate temperature at which incineration is to be conducted, i.e., the reactor temperature. While preheating can be performed before dehumidification, this is not desired economically.

According to known techniques, the catalyst bed diameter in an integral fixed-bed flow-type catalytic reactor should be at least six times, and bed depth at least 30 times the effective catalyst particle diameter to keep the bed edge and end effect suitably small. The preheated gas stream is maintained in contact with the hydrated nickel oxide catalyst for a time sufficient for the oxidation reaction to occur. Contact times of from about 2 to 10 seconds at about 100° C., under conditions of low relative humidity have been found to be sufficient. The gas stream exiting from the catalytic reactor(s) is reduced in its $C_2$-$C_4$ halogenated hydrocarbon content. Preferably the gas stream exiting from the reactor or reactors contains less than 10 ppm, e.g., less than 5 ppm, of the halogenated hydrocarbon, and is cooled prior to disposal. It is advantageous to pass the reactor effluent stream through, for example, a caustic scrubber to remove hydrogen chloride or hydrogen bromide which are oxidation or dehydrohalogenation products, before disposing of the other innocuous gas products. While only one catalyst bed has been described more than one such bed can be used. For example, multiple separate beds in sequence can be used. Such beds can be in one unit, e.g., stacked beds, or in completely separate housing units.

Apparatus in contact with the $C_2$-$C_4$ halogenated hydrocarbon gas stream and incineration products thereof is constructed typically from acid resistant construction materials to minimize corrosion problems. Examples of metallic construction materials include monel, nickel, and stainless steel. Acid resistant engineering plastics, such as Teflon (a trademark of E. I. duPont deNemours and Company for polytetrafluoroethylene) and Ryton (a trademark of Phillips Petroleum Co. for polyphenylene sulfide resins) can be used in the construction of the apparatus as a result of the low temperatures that can be used in the practice of the oxidation process described herein.

The present process is more particularly described in the following Examples which are intended as illustrative only since numerous modifications and variations therein will be apparent to those skilled in the art.

EXAMPLE I

A solution of 132 grams of nickel (II) sulfate hexahydrate dissolved in 420 grams of distilled water was added slowly to a solution of 65.5 grams of anhydrous sodium hydroxide dissolved in 131 grams of distilled water with vigorous stirring. Thereafter, 20.8 grams of a 35 weight percent aqueous solution of hydrogen peroxide was added slowly in approximatly 0.5 ml. aliquots to the hydrous nickel oxide slurry with vigorous stirring. After completing the addition of the hydrogen peroxide solution, the reactant mixture was stirred for a period of approximatly 15 minutes. The precipitate was then washed thoroughly with distilled water using a centrifuge and about 50 percent of the product isolated by filtration. The precipitate was found to require a relatively long time to filter and, consequently, filtration was performed in two stages. The wet filter cakes were pressed between felt pads using a hydraulic press. The first pressed filter cake was dried overnight at about 50° C. The second pressed filter cake was dried at a temperature of approximately 50° C. for a period of approximately 3⅔ days. The partially dried filer cakes were broken up with a mortar and pestle and the minus 8, plus 30 mesh particle size fraction of each dried at approximately 200° C. for a period of 5½ and 7 hours respectively. The dried products were combined. The nickel content of the catalyst was determined to be 87.8 percent as nickel (II) oxide (NiO) by X-ray spectroscopic analysis. X-ray diffraction analysis of the oxide indicated the presence of nickel (II) oxide. The diffraction pattern was broad indicating a microcrystalline or amorphous structure. Thermogravimetric analysis of a sample of the oxide to 400° C. indicated a total weight loss of 7.9 weight percent. The nickel oxide catalysts used in this and the following Examples was judged to have a bulk density of about 1–1.5 cubic centimeters per gram.

EXAMPLE II

Nitrogen containing about 39 parts per million of vinyl chloride and about 2.5 parts per million of vinylidene chloride was mixed with oxygen to produce a stream with the approximate composition of air, i.e., about an 80 volume percent/20 volume percent nitrogen/oxygen gas stream. This synthetic air stream had a dew point of less than −25° C. (relative humidity of less than 2 percent). The small amount of vinyl and vinylidene (hereinafter referred to collectively as vinyl chloride) in the nitrogen was disregarded in calculating the 80/20 volume percent nitrogen/oxygen mixture.

Humidification of the synthetic air stream was accomplished by passing a portion of the stream through a simple water bubbler. The degree of humidification was controlled by proportioning the relative amount of the gas stream which passed through the bubbler.

The vinyl/vinylidene chloride-containing synthetic air stream was introduced into a preheater, which consisted of a tightly wound coil approximately 2.5 inches in diameter and 2.5 inches in height which was fabricated from 0.25 inch diameter stainless steel tubing. The coil was placed in a 700 watt electric furnace and heated to the temperature desired as the inlet gas stream temperature to the reactor. The preheated synthetic air stream was introduced into the bottom of a vertical catalytic reactor, which was constructed of 0.75 inch diameter 316 stainless steel and which measured approximately 8 inches in length. The catalyst was supported on a 35 mesh stainless steel screen which was located approximately 1.5 inches above the synthetic air stream inlet. A second screen was placed on the top of the catalyst bed to prevent the possible ejection of catalyst particles. Two thermocouples were inserted into the reactor approximately 0.5 inch above and below the catalyst bed to monitor the synthetic air stream temperatures. These thermocouples were positioned such that the junction was located in the center of the reactor. The reactor was insulated with asbestos tape to minimize heat loss and was heated by means of a heating tape. The thermocouple located approximately 0.5 inch above the catalyst bed was utilized as the catalyst bed temperature reference, i.e., the reactor temperature.

The reactor gas effluent was cooled to ambient temperature by means of an approximately 40 inch U-shaped section of 0.25 inch diameter stainless steel tubing. The cooled reactor gas effluent was exhausted to a laboratory hood. At various times during the period in which the synthetic air stream which contained vinyl/vinylidene chloride, was introduced into the reactor, samples were taken of the gas stream inlet to the preheater and of the reactor gas stream effluent exiting the cooler in order to assess the vinyl/vinylidene chloride concentration of the gas stream before and after the catalytic reactor, i.e., the catalyst bed. The vinyl/vinylidene chloride concentration of such gas streams was measured by gas-liquid chromatography utilizing flame ionization detectors. The total gas flow rate to the reactor was measured as was the inlet and outlet temperatures to the reactor.

About 14 grams of the nickel oxide catalyst described in Example I was charged to the reactor as the catalyst bed and tested as a vinyl chloride and vinylidene chloride incineration catalyst. The reactor temperature was maintained at 104° C. The data accumulated is found in Table I.

TABLE I

| Sample No. | Inlet Temp.[a] | Flow Rate[b] | % Rel. Humid.[c] | VCM Concentration[d] | | % Diff.[e] | VDCM Concentration[d] | | Time of Operation[f] |
|---|---|---|---|---|---|---|---|---|---|
| | | | | Inlet | Outlet | | Inlet | Outlet | |
| 1 | 107 | 9 | 1.9 | 39.0 | 11.5 | 70 | 2.5 | N.D. | 0.25 |
| 2 | 107 | 9 | 2.0 | 39.0 | 6.5 | 85 | 2.5 | N.D. | 0.45 |
| 3 | 107 | 9 | 1.9 | 39.0 | 5.5 | 85 | 2.5 | N.D. | 0.60 |
| 4 | 107 | 9 | 57 (4) | 39.0 | 3.5 | 90 | 2.5 | N.D. | 0.90 |
| 5 | 107 | 9 | 57 (15) | 39.0 | 8.5 | 80 | 2.5 | N.D. | 1.10 |
| 6 | 107[g] | 9 | 3.4 | 39.0 | 16.0 | 60 | 2.5 | N.D. | 1.25 |
| 7 | 107 | 9 | 2.3 | 39.0 | 8.5 | 80 | 2.5 | N.D. | 1.70 |
| 8 | 107 | 9 | 2.2 | 39.0 | 6.0 | 85 | 2.5 | N.D. | 1.90 |
| 9 | 110[h] | 44 | 1.1 | 39.0 | 4.5 | 90 | 2.5 | N.D. | 0.25 |
| 10 | 110 | 44 | 57 (7) | 39.0 | 21.0 | 45 | 2.5 | N.D. | 0.60 |
| 11 | 110[i] | 44 | 1.0 | 39.0 | 21.5 | 45 | 2.5 | N.D. | 0.80 |

[a]Gas stream temperature at inlet to catalyst bed in ° C.
[b]Total 80/20 $N_2/O_2$ flow rate in liter/hour.
[c]Relative humidity (%) of gas stream at 23° C. Numbers in parentheses refer to the period of time in minutes that the humidified gas stream was used before the sample was obtained.
[d]VCM (vinyl chloride) or VDCM (vinylidene chloride) concentration in ppm. N.D. denotes not detected. Trace denotes $\leq 0.2$ ppm. All values rounded to 0.5 ppm.
[e]% difference in the VCM concentration of the gas stream.
[f]Approximate total time of operation with respect to VCM and VDCM being present in the gas stream in hours.
[g]Sample obtained 8 minutes after discontinuing increased relative humidity atmosphere.
[h]Remaining samples obtained after conditioning catalyst bed overnight at 104° C. in the reactor without gas flow.
[i]Sample obtained 11 minutes after discontinuing increased relative humidity atmosphere.

The data of Table I show that the nickel oxide catalyst of Example I exhibits a relatively high level of catalytic activity at incineration conditions of low relative humidity and at 104° C. With respect to vinyl chloride and vinylidene chloride. More specifically, the reduction in the vinyl chloride content of the inlet gas stream was 80–90 percent; and, the reduction in vinylidene chloride content was essentially 100 percent, no detectable concentration thereof being found. The data appear to show also a gradual increase in catalytic activity with time during the first hour of operation. After heating overnight at 104° C., a significant increase in the level of catalytic activity was found (Sample 9), i.e., a 90 percent efficiency was found at the higher (44 liter/hour) flow rate of operation. The data further show an inhibition of catalytic activity by water vapor. This inhibition was found both before and after the heating overnight at 104° C. without gas flow.

EXAMPLE III

A solution of 66.0 grams of nickel (II) sulfate hexahydrate in 210 grams of distilled water was added slowly to a solution of 33 grams of anhydrous sodium hydroxide dissolved in 66 grams of distilled water with vigorous stirring. Thereafter, the reactant mixture was stirred for about 30 minutes. The precipitate was washed four times with distilled water by decantation using a centrifuge, and then isolated by filtration. The wet filter cake was pressed between felt pads and the pressed filter cake dried at about 50° C. for about 24 hours. The partially dried filter cake was ground with a mortar and pestle and the minus 8, plus 30 mesh particle size fraction of this product dried at about 200° C. for about 7½ hours. A 27 inch mercury vacuum was used during the final two hours of the drying period.

The nickel content of the product was found to be about 84.4 weight percent, as nickel (II) oxide (NiO), by X-ray spectroscopic analysis. Thermogravimetric analysis to 400° C. indicated that there was a total weight loss of about 7.4 weight percent. X-ray diffraction analysis indicated the significant presence of a crystalline component whose diffraction pattern could be identified as nickel (II) oxide.

About 13 grams of this catalyst was tested as a vinyl chloride and vinylidene chloride incineration catalyst at a reactor temperature of 104° C. in essentially the same manner as the nickel oxide catalyst of Example I was tested, as described in Example II. The data accumulated is found in Table II.

flow rate of 44 liters/ hour, inlet temperature of about 118° C. and a relative humidity of about 2.0 percent.

EXAMPLE V

The nickel (II) oxide catalyst prepared and tested in Example III was dried at about 200° C. for approximately 1.5 hours at a pressure of 26.5 inches of mercury. About 8.8 grams of the dried catalyst was charged to the catalyst chamber of the apparatus described in Example II. The apparatus was modified by substituting

TABLE II

| Sample No. | Inlet Temp.[a] | Flow Rate[b] | % Rel. Humid.[c] | VCM Concentration[d] Inlet | VCM Concentration[d] Outlet | % Diff.[e] | VDCM Concentration[d] Inlet | VDCM Concentration[d] Outlet | Time of Operation[f] |
|---|---|---|---|---|---|---|---|---|---|
| 1 | 103 | 44 | 1.9 | 46.5 | 31.5 | 30 | 3.5 | N.D. | 0.10 |
| 2 | 102 | 9 | 2.5 | 39.5 | 8.0 | 80 | 3.0 | N.D. | 0.40 |
| 3 | 102 | 9 | 52 (11) | 39.5 | 6.5 | 85 | 3.0 | N.D. | 0.65 |
| 4 | 102 | 9 | 52 (30) | 39.5 | 28.5 | 30 | 3.0 | N.D. | 1.00 |
| 5 | 102[g] | 9 | 3.7 | 39.5 | 26.5 | 35 | 3.0 | N.D. | 1.10 |

[a-f]See Table I
[g]Sample obtained 9 minutes after discontinuing increased relative humidity atmosphere.

The data of Table II show that the nickel (II) oxide catalyst of this Example exhibits a relatively high level of catalytic activity at incineration conditions of low relative humidity, a flow rate of 9 liters per hour and a reactor temperature of 104° C. with respect to vinyl chloride and vinylidene chloride. More specifically, the reduction in the vinyl chloride content of the inlet gas stream was 80–85 percent; and, the reduction in vinylidene chloride content was essentially 100 percent, no detectable concentration thereof being found. The data further show that water vapor inhibits the activity of the nickel (II) oxide catalyst.

EXAMPLE IV

Approximately 20 cc. of a commercial nickel (II) oxide on alumina catalyst was dried in a vacuum oven at a temperature of approximately 200° C. and a vacuum of about 27 inches of mercury for a period of about 3 hours. The nickel content of this catalyst was about 14 weight percent as nickel (II) oxide (NiO) and had a B.E.T. surface area of 140 square meters per gram. X-ray spectroscopic analysis of this commercial catalyst revealed an alumina background which masked the nickel oxide. 15.2 grams of the dried catalyst was charged to the reactor described in Example II and tested as an incineration catalyst for vinyl chloride and vinylidene chloride. The catalyst was charged to the reactor with the reactor temperature at 104° C. and with an 80/20 nitrogen/oxygen gas stream passing through the reactor. This gas stream was peheated to about 108° C. during the loading.

The catalyst showed no activity with respect to incineration of vinyl chloride or vinylidene chloride at a gas flow rate of 44 liters/ hour, inlet temperature of about 118° C. and a relative humidity of about 2.0 percent.

for the nitrogen gas cylinder containing vinyl chloride and vinylidene chloride a gas cylinder of nitrogen containing analytically measured 10–50 parts per million (ppm) each of vinyl chloride, vinylidene chloride, methyl chloroform (1,1,1-trichloroethane), trichloroethylene and less than 10 parts per million of 1,1,2-trichloroethane and perchloroethylene. The catalyst was tested as an incineration catalyst for the aforementioned $C_2$-chlorinated hydrocarbons at a reactor temperature of 104° C. The data accumulated is summarized in Table III.

TABLE III

| Sample No. | Inlet[a] Temp. | Total Flow[b] Rate | % Rel.[c] Humid. | VCM Concentration[d] Inlet | VCM Concentration[d] Outlet | VDCM Concentration[d] Inlet | VDCM Concentration[d] Outlet | MC Concentration[d] Inlet | MC Concentration[d] Outlet | Trichlor. Inlet | Concentration[d] Outlet | Perchlor. Inlet | Concentration[d] Outlet | Time of[e] Operation |
|---|---|---|---|---|---|---|---|---|---|---|---|---|---|---|
| 1 | 103 | 9 | 0.7 | 6.5 | 0.5 | 6.0 | N.D. | 11.5 | N.D. | 5.5 | N.D. | NM | NM | 0.65 |
| 2 | 105 | 44 | 0.6[f] | 9.0 | 6.0 | 10.0 | 4.0 | 29.0 | N.D. | 22.5 | <0.5 | 11.0 | 1.0 | 0.30 |
| 3 | 105 | 44 | 0.3[f] | 9.0 | 4.5 | 10.0 | 10.5 | 29.0 | N.D. | 22.5 | N.D. | 11.0 | 3.5 | 1.55 |
| 4 | 105 | 9 | 0.7 | 9.0 | 2.5 | 10.0 | 2.5 | 29.0 | N.D. | 22.5 | N.D. | 11.0 | 2.5 | 2.00 |
| 5 | 103 | 9 | 1.0[f] | 6.0 | 3.5 | 7.5 | 5.5 | NM | <2 | 4.0 | N.D. | NM | 1.5 | 1.50 |
| 6 | 103 | 9 | 0.7 | 10.5 | 5.5 | 10.0 | 10.0 | 28.0 | N.D. | 21.5 | N.D. | 8.0 | 1.0 | 3.35 |

[a-c]See Table I.
[d]All concentrations in ppm. N.D. denotes Not Detected, <0.4. N.M. denotes not measured due to instrument malfunction. All values rounded to 0.5 ppm. MC = methylchloroform; VCM = vinyl chloride; VDCM = vinylidene chloride; Trichlor = trichloroethylene; Perchlor = perchloroethylene.
[e]Approximate total time of operation in hours under the set of conditions specified.
[f]Samples obtained after 1) passing 80/20 $N_2/O_2$ stream through catalyst bed for 30 minutes, and 2) allowing catalystbed to heat at 104 ° C. overnight without flow.

The data presented in Table III shows that the nickel (II) oxide catalyst exhibited a relatively high level of activity towards all of the compounds listed at the lower (9 liters/hour) flow rate. At the higher (44 liters/hour) flow rate, the activity of the oxide appears to be higher towards the 2 and 3 chlorine atom-containing $C_2$-hydrocarbons relative to that towards either vinyl chloride or perchloroethylene. The results with respect to vinylidene chloride can be misleading for the reason that vinylidene chloride can be formed by decomposition of methyl chloroform. Thus, the apparent finding of essentially no significant difference in the vinylidene chloride concentration in the second sample obtained at the 44 liter/hour flow rate may actually indicate that significant incineration was occurring. Results obtained with respect to 1,1,2-trichloroethane are not shown in Table III for the reason that the concentration of this compound in the inlet to the catalyst bed was relatively low and analytical sensitivity toward this compound was also low. However, no detectable concentration (< 0.3 ppm) of 1,1,2-trichloroethane was found in the exhaust from the reactor when measurable inlet concentrations of from 1.5 to 9.5 ppm were found. Thus, such data indicates that the nickel (II) oxide also exhibits incineration activity towards this 3 chlorine atom-containing C$_2$-hydrocarbon.

EXAMPLE VI

The catalyst bed of Example V was heated for a period of about 22 hours at 104° C. During the initial 2 hours of this period, an 80/20 nitrogen/oxygen flow of 44 liters/hour was maintained through the bed. At the end of the heating period, the reactor temperature was lowered to 125° F. (about 52° C.) and after a period of approximately 4 days at that temperature, the catalyst was tested for activity towards chlorinated C$_2$-hydrocarbons at a reactor temperature of 52° C. The initial results obtained are summarized in Table IV.

liters per hour, a very high initial concentration of vinylidene chloride was found in the outlet gas stream (Sample No. 9) i.e., approximately 130 ppm versus an inlet concentration of approximately 10 ppm. This result also suggests that a dehydrochlorination reaction occurred however, the result might have occurred because of adsorption of the less volatile chlorinated C$_2$-hydrocarbons.

EXAMPLE VII

The nickel (II) oxide catalyst of Example VI was heated in the reactor at 104° C. for 21 hours. Thereafter, the reactor temperature was reduced to about 54° C. and the procedure of Example VI repeated except that the flow rate was increased to 44 liters per hour. The

TABLE IV

| Sample No. | Inlet Temp.[a] | Flow Rate[b] | % Rel.[c] Humid | VCM Conc.[d] Inlet | VCM Conc.[d] Outlet | VDCM Conc.[d] Inlet | VDCM Conc.[d] Outlet | MC Conc.[d] Inlet | MC Conc.[d] Outlet | Trichlor Conc.[d] Inlet | Trichlor Conc.[d] Outlet | Perchlor Conc.[d] Inlet | Perchlor Conc.[d] Outlet | 1,1,2-TCE Conc.[d] Inlet | 1,1,2-TCE Conc.[d] Outlet | Time of Operation[e] |
|---|---|---|---|---|---|---|---|---|---|---|---|---|---|---|---|---|
| 1 | 50 | 9 | 0.6 | 9.5 | 2.0 | 9.0 | N.D. | 29.0 | N.D. | 19.5 | N.D. | 7.0 | <0.5 | 1.0 | N.D. | 0.55 |
| 2 | 50 | 9 | 0.5 | 9.0 | 6.5 | 8.5 | N.D. | 28.0 | N.D. | 21.5 | N.D. | 8.5 | 1.0 | 1.0 | N.D. | 1.00 |
| 3 | 50 | 7.2 (18)[f] | 0.3 | 8.0 | 10.0 | 8.5 | 1.5 | 30.5 | N.D. | 21.0 | N.D. | 8.0 | N.D. | 4.5 | N.D. | 2.05 |
| 4 | 50 | 7.2 (48)[f] | 0.3 | 8.0 | 11.0 | 8.5 | 2.5 | 30.5 | N.D. | 21.0 | N.D. | 8.0 | N.D. | 4.5 | N.D. | 2.55 |
| 5 | 50 | 7.2 (112)[f] | 0.3 | 8.0 | 11.5 | 8.5 | 6.0 | 30.5 | N.D. | 21.0 | N.D. | 8.0 | N.D. | 4.5 | N.D. | 3.55 |
| 6 | 50 | 7.2 (153)[f] | 0.3 | 8.0 | 12.0 | 8.5 | 9.5 | 30.5 | N.D. | 21.0 | N.D. | 8.0 | N.D. | 4.5 | N.D. | 4.25 |
| 7 | 47 | 35 (189)[f] | 0.2 | 11.0 | 10.5 | 11.0 | 15.5 | 40.5 | 0.5 | 32.0 | <0.3 | 16.5 | <0.3 | 2.5 | N.D. | 5.05 |
| 8 | 46 | 35 (251)[f] | 0.2 | 11.0 | 11.0 | 11.0 | 27.5 | 40.5 | 4.5 | 32.0 | 3.0 | 16.5 | 0.5 | 2.5 | N.D. | 6.10 |
| 9 | 50[g] | 9 | 1.7 | 9.0 | 2.5 | 9.0 | 132.0 | 36.0 | N.D. | 13.5 | 3.0 | 3.0 | N.D. | 1.0 | N.D. | 0.15 |
| 10 | 49 | 9 | 0.9 | 9.0 | 9.5 | 9.0 | 89.5 | 34.0 | N.D. | 14.0 | 5.5 | 2.5 | 1.0 | 1.0 | N.D. | 1.30 |
| 11 | 49 | 9 | 0.7 | 9.0 | 8.5 | 9.0 | 16.0 | 34.0 | N.D. | 14.0 | 7.0 | 2.5 | 1.0 | 1.0 | N.D. | 260 |

[a]-[e]See Table III
[f]Nitrogen flow only, no oxygen. Figure in parentheses indicate total length of time in minutes of the no oxygenflow condition. Nitrogen flow rate increased to 35 1/hr after a total time of 184 minutes at the 7.8 1/hr condition.
[g]Remaining samples obtained after heating catalyst bed at 52° C. for 2⅔ days without flow.

The initial two results of Table IV show that the nickel (II) oxide catalyst exhibited a significant level of activity towards all of the chlorinated C$_2$-hydrocarbons tested. However, in view of the finding that only the most volatile compound, i.e., vinyl chloride, was found in detectable concentrations in the outlet from the reactor, an attempt was made to determine if the removal of the other less volatile compounds was due to absorption, rather than oxidation. The oxygen flow was discontinued therefore, and only nitrogen containing the C$_2$-chlorinated hydrocarbons introduced into the reactor (Sample Nos. 3–8).

After discontinuing oxygen flow to the reactor, an immediate increase in the concentration of vinyl chloride and vinylidene chloride was found. This result suggests that at least with respect to these two compounds, a catalytic oxidation reaction was occurring at the lower reaction temperature of 52° C. With respect to the other compounds, either catalytic oxidation or other reactions, e.g., dehydrochlorination, could occur with oxygen from the catalyst itself. With respect to vinylidene chloride, the results obtained after prolonged operation in the absence of oxygen show that a significantly high concentration was found in the outlet stream relative to that in the inlet stream, which result suggests that dehydrochlorination of methyl chloroform and/or 1,1,2-trichloroethane was occurring.

The catalyst was heated then at 52° C. for approximately 2⅔ days without the flow of synthetic air gas through the reactor. On start-up, at a flow rate of 9 results obtained are summarized in Table V. These results are similar to those summarized in Table IV. Under the higher flow rate of 44 liters per hour, significant concentrations of all of the major components of the gas stream were found after approximately one hour of operation.

The catalyst bed was purged for three minutes with nitrogen, removed from the reactor and placed in a 24 cubic centimeter vial, which was sealed for a head space analysis. After equilibration of the catalyst overnight at 23° C., the head space was analyzed and the results obtained are also tabulated in Table V. The catalyst was then equilibrated for two hours at 90° C. and a further head space analysis obtained. At 23° C., low concentrations of all of the major components were found in the head space above the catalyst. At 90° C., relatively high concentrations of all of the components except vinyl chloride and 1,1,2-trichloroethane were found. This result suggests that at least part of the apparent activity of the nickel (II) catalyst at 50° C. was due to adsorption. The data further indicates that dehydrochlorination also occurred, since the concentration of vinylidene chloride was much higher than that anticipated on the basis of the relative inlet concentrations and outlet concentrations of the components. Thus, at lower operating temperatures, e.g., 50° C., the removal of chlorinated C$_2$-hydrocarbons from air by nickel (II) oxide appears to be due to several mechanisms which occur simultaneously, i.e., oxidation, adsorption and dehydrochlorination.

TABLE V

| Sample No. | Inlet Temp.[a] | Flow Rate[b] | % Rel. Humid.[c] | VCM Conc.[d] Inlet | VCM Conc.[d] Outlet | VDCM Conc.[d] Inlet | VDCM Conc.[d] Outlet | MC Conc.[d] Inlet | MC Conc.[d] Outlet | Trichlor Conc.[d] Inlet | Trichlor Conc.[d] Outlet | Perchlor. Conc.[d] Inlet | Perchlor. Conc.[d] Outlet | 1,1,2-TCE Conc.[d] Inlet | 1,1,2-TCE Conc.[d] Outlet | Time of Operation[e] |
|---|---|---|---|---|---|---|---|---|---|---|---|---|---|---|---|---|
| 1 | 51 | 44 | 1.1 | 8.5 | 7.5 | 8.5 | 0.5 | 43.0 | N.D. | 20.5 | 1.0 | 8.0 | 2.0 | 1.5 | N.D. | 0.10 |

TABLE V-continued

| Sample No. | Inlet Temp.[a] | Flow Rate[b] | % Rel. Humid.[c] | VCM Conc.[d] | | VDCM Conc.[d] | | MC Conc.[d] | | Trichlor Conc.[d] | | Perchlor. Conc.[d] | | 1,1,2-TCE Conc.[d] | | Time of Operation[e] |
|---|---|---|---|---|---|---|---|---|---|---|---|---|---|---|---|---|
| | | | | Inlet | Outlet | Inlet | Outlet | Inlet | Outlet | Inlet | Outlet | Inlet | Outlet | Inlet | Outlet | |
| 2 | 50 | 44 | 0.6 | 8.5 | 8.0 | 8.5 | 11.5 | 43.0 | 1.0 | 20.5 | 1.5 | 8.0 | 0.5 | 1.5 | N.D. | 1.20 |
| 3 | 50 | 44 | 0.5 | 8.5 | 5.5 | 9.5 | 9.0 | 45.0 | 11.5 | 22.5 | 2.5 | 9.0 | 1.0 | 2.0 | N.D. | 1.55 |
| 4 | Headspace at 23° C | | | N.D. | | 3.5 | | 2.5 | | 2.0 | | 1.5 | | N.D. | | |
| 5 | Headspace at 90° C | | | 2.0 | | 293.5 | | 210.5 | | 200.0 | | 110.0 | | N.D | | |

[a]-[e]See Table III

EXAMPLE VIII

A sample of commercial nickel (II) hydroxide containing 61 weight percent nickel and about 1.3 weight percent nickel carbonate as the only major impurity was formed into approximately ¼ inch diameter by ¼ inch long pellets using a manual press. The pellets were broken approximately in half lengthwise and dried for about seven hours at approximately 200° C. During the final 4.5 hours of the drying period, a 26.5 inch mercury vacuum was applied to the container housing the pellets. The pellets were not homogeneous in color. They exhibited visible green (nickel hydroxide) and black (nickel oxide) areas. The nickel content of the product was found to be about 79.1 weight percent as nickel (II) oxide by X-ray spectroscopic analysis. Thermogravimetric analysis to 400° C. indicated that there was a total weight loss of about 1.8 percent at 200° C. and 16.0 percent at 400° C. An X-ray diffraction pattern of the product indicated the presence of a crystalline phase which could be identified as nickel (II) hydroxide.

Using the apparatus and procedure of Example II, about 10.0 grams of this catalyst was tested as a vinyl chloride incineration catalyst at a reactor temperature of 104° C. The data accumulated is found in Table VI.

TABLE VI

| Sample No. | Inlet Temp.[a] | Flow Rate[b] | % Rel. Humid.[f] | VCM Concentration[d] | | % Diff.[e] | Time of Operation |
|---|---|---|---|---|---|---|---|
| | | | | Inlet | Outlet | | |
| 1 | 107 | 9 | 0.9 | 19.5 | 10.5 | 45 | 0.85 |
| 2 | 107 | 9 | 0.7 | 53.5 | 53.5[g] | — | 2.20 |

[a]-[f]See Table I
[g]Average of three analyses of outlet concentration.

The data of Table VI shows that the partially converted nickel hydroxide sample exhibited essentially no activity after only approximately 2 hours operation at 104° C. and only a relatively short period of low activity therebefore. Because of such results and the compositional analysis which indicated that a significant proportion of nickel hydroxide remained unconverted to nickel oxide, no further testing of this catalyst was performed.

EXAMPLE IX

Approximately 30 grams of the commercial nickel (II) hydroxide utilized in Example VIII was slurried with the approximately 100 grams of distilled water. After filtering the slurry, the wet filter cake was partially dried by pressing between absorbent paper toweling using a hydraulic press. The pressed cake was dried at approximately 70° C. for about 2 hours and then broken up into a minus 8 mesh particle size fraction using a mortar and an 8 mesh screen. The minus 8, plus 30 mesh size fraction was dried at approximately 215° C. for a period of about 18.5 hours and then at approximately 225° C. for a period of about 8.5 hours under a 26.5 inch mercury vacuum. Thereafter, the sample was heated at 220° C. for approximately 2⅔ days additional. The product was found to be about 94.1 weight percent nickel (II) oxide by X-ray spectroscopic analysis. Thermogravimetric analysis to 400° C. showed a weight loss of 2.0 percent at 200° C. and 3.7 percent at 400° C. X-ray diffraction analysis of the sample indicated the sample to contain a crystalline phase whose diffraction pattern could be identified as nickel (II) oxide. Ten grams of this oxide was tested as an incineration catalyst using the procedure described in Example V with the apparatus described in Example II. The flow rate used was 44 liters per hour total of the 80/20 nitrogen/oxygen synthetic air mixture containing $C_2$-halogenated hydrocarbons. The results obtained are tabulated in Table VII.

TABLE VII

| Sample No. | Inlet Temp. | Outlet Temp.[a] | % Rel. Humid.[c] | VCM Conc.[d] | | VDCM Conc.[d] | | MC Conc.[d] | | Trichlor Conc.[d] | | TCE Conc.[f] | | Perchlor Conc.[d] | | Time of Operation[e] |
|---|---|---|---|---|---|---|---|---|---|---|---|---|---|---|---|---|
| | | | | Inlet | Outlet | Inlet | Outlet | Inlet | Outlet | Inlet | Outlet | Inlet | Outlet | Inlet | Outlet | |
| 1 | 100 | 104 | 0.3 | 9.0 | 1.0 | 7.5 | N.D. | 36.0 | N.D. | 12.0 | N.D. | 0.5 | N.D. | 3.0 | N.D. | 0.80 |
| 2 | 101 | 104 | 0.3 | 9.0 | 6.0 | 7.5 | 5.0 | 36.0 | N.D. | 12.0 | N.D. | 0.5 | N.D. | 3.0 | 1.0 | 1.35 |
| 3 | 102 | 104 | 0.3 | 9.0 | 6.0 | 7.5 | 23.0 | 36.0 | N.D. | 12.0 | N.D. | 0.5 | N.D. | 3.5 | 8.5 | 2.00 |
| 4 | 51[g] | 54 | 0.3 | 6.0 | 4.0 | 6.5 | 1.0 | 26.5 | N.D. | 17.5 | N.D. | 1.0 | N.D. | 9.5 | N.D. | 0.65 |
| 5 | 51 | 54 | 0.3 | 6.0 | 7.0 | 6.5 | 9.0 | 26.5 | N.D. | 17.5 | N.D. | 1.0 | N.D. | 9.5 | 0.5 | 1.10 |
| 6 | 50 | 54 | 0.3 | 6.0 | 4.0 | 6.5 | 10.0 | 26.5 | N.D. | 17.5 | N.D. | 1.0 | N.D. | 9.5 | 0.5 | 1.55 |
| 7 | 50 | 54 | 0.2 | 6.0 | 3.0 | 6.5 | 10.5 | 26.5 | 0.5 | 17.5 | N.D. | 1.0 | N.D. | 9.5 | N.D. | 2.00 |
| 8 | 50 | 54 | 0.2 | 6.0 | 2.0 | 6.5 | 7.5 | 26.5 | 2.5 | 17.5 | 1.0 | 1.0 | N.D. | 9.5 | 0.5 | 3.00 |
| 9 | Headspace Analysis at 23° C | | | N.D. | | 8.0 | | 2.0 | | 1.0 | | N.D. | | N.D. | | — |
| 10 | Headspace Analysis at 90° C[h] | | | 2.0 | | 78.8 | | 55.5 | | 96.5 | | N.D. | | 40.5 | | — |

[a]Inlet and outlet (reactor) gas stream temperatures in ° C.
[c]-[e]See Table III
[f]Concentration in ppm. TCE = 1,1,2-trichloroethane
[g]Samples obtained after 1) purging with 44 1/hr 80/20 $N_2/O_2$ stream for 20 minutes, and 2) heating overnight at a reactor temperature of 104° C.
[h]Low, but experimentally significant quantities of cis and trans 1,2-dichloroethylene also detected.

The data of Table VII indicates that the activity level of this nickel (II) oxide sample was comparable so that of the nickel (II) oxide sample prepared in Example V (Tables III and IV). Head space analysis at 90° C. of the catalyst following completion of testing at a reactor temperature of 54° C. shows the approximately 80 percent of the chlorinated $C_2$-hydrocarbons found in the head space was vinylidene chloride. This result suggests further that nickel (II) oxide caused dehydrochlorination of methylchloroform and trichloroethane. The head space analysis at 90° C. also suggests that adsorption is not a primary factor in removal of $C_2$-chlorinated hydrocarbons from a gas stream containing some at high temperatures, e.g., 104° C. or higher. At 90° C. all of the primary chlorinated hydrocarbon constituents of the gas stream were found to exhibit significant vapor pressures above the nickel (II) oxide surface. Thus, at 104° C. or higher, essentially quantative removal of these constituents from the gas stream would not be expected for a simple adsorptive mechanism.

scribed in Example II. The $C_2$-chlorinated hydrocarbon containing nitrogen stream was that utilized in Example V. The reactor temperature used for Samples 1–4 was 104° C. The reactor temperature used for Samples 5–11 was 188° C. The results obtained are summarized in Table VIII.

TABLE VIII

| Sample No. | Inlet Temp.[a] | Flow Rate[b] | % Rel Humidity[c] | VCM Conc.[d] Inlet | VCM Conc.[d] Outlet | VDCM Conc.[d] Inlet | VDCM Conc.[d] Outlet | MC Conc.[d] Inlet | MC Conc.[d] Outlet | Trichlor. Conc.[d] Inlet | Trichlor. Conc.[d] Outlet | TCE Conc.[f] Inlet | TCE Conc.[f] Outlet | Perchlor Conc.[d] Inlet | Perchlor Conc.[d] Outlet | Time of Operation[e] |
|---|---|---|---|---|---|---|---|---|---|---|---|---|---|---|---|---|
| 1 | 111 | 44 | 0.7 | 9.0 | N.D. | 10.0 | N.D. | 39.0 | N.D. | 17.5 | N.D. | 1.5 | N.D. | 8.5 | N.D. | 0.30 |
| 2 | 109 | 44 | 0.4 | 9.0 | 1.0 | 10.0 | 1.0 | 39.0 | N.D. | 17.5 | N.D. | 1.5 | N.D. | 8.5 | N.D. | 1.40 |
| 3 | 109 | 44 | 51 (24) | 8.0 | 8.0 | 9.5 | 41.5 | 38.0 | 1.5 | 16.0 | 0.5 | 1.5 | 0.5 | 7.5 | 15.0 | 1.90 |
| 4 | 110 | 44 | 53 (82) | 8.0 | 8.0 | 9.5 | 44.0 | 38.0 | 3.0 | 16.0 | 2.0 | 1.5 | N.D. | 7.5 | 8.5 | 2.85 |
| 5 | 171[g] | 44 | 0.4 | 9.5 | N.D. | 9.5 | N.D. | 29.0 | N.D. | 24.0 | N.D. | 1.5 | N.D. | 14.5 | 1.5 | 0.25 |
| 6 | 171 | 44 | 54 (32) | 9.0 | 3.0 | 9.0 | N.D. | 29.0 | N.D. | 22.5 | N.D. | 1.5 | N.D. | 14.0 | 7.0 | 1.40 |
| 7 | 171 | 44 | 55 (98) | 9.0 | 3.0 | 9.0 | 2.0 | 29.0 | N.D. | 22.5 | N.D. | 1.5 | N.D. | 14.0 | 8.5 | 2.50 |
| 8 | 171 | 44 | 54 (131) | 9.0 | 3.5 | 9.0 | 3.5 | 29.0 | N.D. | 22.5 | N.D. | 1.5 | N.D. | 14.0 | 10.5 | 3.05 |
| 9 | 169 | 44 | 55 (200) | 9.5 | 5.5 | 9.5 | 9.5 | 30.0 | N.D. | 25.0 | 1.5 | 2.0 | N.D. | 16.0 | 12.5 | 4.20 |
| 10 | 169 | 44 | 55 (287) | 9.5 | 5.5 | 9.5 | 15.5 | 30.0 | N.D. | 25.0 | 5.5 | 2.0 | N.D. | 16.0 | 15.0 | 5.65 |
| 11 | 169[h] | 44 | 0.6 | 9.5 | 3.5 | 9.5 | 2.0 | 30.0 | N.D. | 25.0 | N.D. | 2.0 | N.D. | 16.0 | 15.0 | 6.20 |

[a]–[e] See Table III
[f] TCE = 1,1,2-trichloroethane. Concentration in ppm. N.D. denotes not detected; all values rounded to ±0.5 ppm.
[g] Remaining samples obtained after purging reactor with 44 l/hr. 80/20 $N_2/O_2$ gas stream for 10 minutes, heating overnight at 104° C., and pre-heating reactor to 188° C. for 28 minutes.
[h] Sample obtained eleven minutes after discontinuing humidification of the gas stream.

EXAMPLE X

A slurry of 50 grams of the commercial nickel (II) hydroxide utilized in Example VIII and 100 grams of distilled water was filtered and the filter cake pressed between absorbent toweling. The filter cake was dried at approximately 70° C. for a period of approximately 3 days. The dried nickel (II) hydroxide cake was then broken into a minus 8 mesh particle size product and the minus 8, plus 30 mesh particle size fraction dried at approximately 190° C. for a period of approximately 27 hours. During the final three hours of this drying period, a 26 inch mercury vacuum was applied. The material was then heated at approximately 225° C. for a period of 27 hours. During the last 8 hours of this period a 26 inch mercury vacuum was applied.

The nickel content of this oxide was found to be 94.3 weight percent as nickel (II) oxide by elemental X-ray spectroscopic analysis. The results of X-ray diffraction analysis indicated that a crystalline phase was present and that this phase was nickel (II) oxide. The X-ray diffraction pattern of the product was broad and diffuse, indicating the sample was microcrystalline or amorphous. Thermogravimetric analysis to 400° C. indicated a total weight loss of 1.28 percent at 200° C. and 3.7 weight percent at 400° C. About 12 grams of this product was used as the catalyst bed in the apparatus described in Example II. The $C_2$-chlorinated hydrocarbon containing nitrogen stream was that utilized in Example V. The reactor temperature used for Samples 1–4 was The data of Table VIII indicate that the nickel (II) oxide catalyst experienced a rapid loss in activity with an increase in relative humidity of the entering gas stream at a reactor temperature of 104° C. (Compare Sample Numbers 1 and 2 with Sample Numbers 3 and 4). The presence of 41–44 ppm of vinylidene chloride in the outlet gas stream (Sample Nos. 3 and 4) indicates that vinylidene chloride was probably being formed from the methylchoroform present in the inlet gas stream. The effect of water vapor on the catalytic activity of the nickel (II) oxide is significantly lower at the higher (188° C.) reactor operating temperature. For example, even after approximately 5 hours operation at 54–55 percent relative humidity, the nickel (II) oxide was still found to exhibit a significant although reduced level of activity towards all of the chlorinated $C_2$-hydrocarbons except perchloroethylene. These results indicate that the effect of water vapor is dependent on the operating temperature. Finally, Sample 11 indicates that the decrease in catalytic acitivity occasioned by water vapor is not permanent since the activity of the catalyst increases upon a return to low relative humidity conditions.

EXAMPLE XI the catalyst of Example X was purged with a 44 liter per hour flow rate of 80/20 nitrogen/oxygen flow for a period of 5 minutes. No chlorinated $C_2$-hydrocarbons were present in the nitrogen/oxygen stream. After purging, the flow rate was reduced to approximately 9 liters per hour and a stream of vinyl chloride-containing nitrogen introduced into the gas inlet supply line from a gas cylinder of nitrogen containing an analytically measured 2.5 weight percent vinyl chloride. The reactor temperature used was 188° C. The results obtained are summarized in Table IX. Although only vinyl chloride was introduced into the reactor, the outlet from the reactor was examined specifically for all of the chlorinated $C_2$-hydrocarbons.

TABLE IX

| Sample No. | Inlet Temp.[a] | Flow Rate[b] | % Rel. Humid.[c] | VCM Conc.[d] Inlet | VCM Conc.[d] Outlet | % Diff.[e] | VDCM Outlet Conc.[d] | MC Outlet Conc.[d] | Trichlor. Outlet Conc.[d] | TCE Outlet Conc.[d] | Perchlor Outlet Conc.[d] | Time of Operation[f] |
|---|---|---|---|---|---|---|---|---|---|---|---|---|
| 1 | 182 | 9 | 0.9 | 750 | 35 | 95 | N.D. | N.D. | N.D. | N.D. | 5.5 | 0.70 |
| 2 | 186[g] | 9 | 1.5 | 1610 | 260 | 85 | N.D. | N.D. | N.D. | 1.0 | 2.0 | 0.60 |

TABLE IX-continued

| Sample No. | Inlet Temp.[a] | Flow Rate[b] | % Rel. Humid.[c] | VCM Conc.[d] Inlet | VCM Conc.[d] Outlet | % Diff.[e] | VDCM Outlet Conc.[d] | MC Outlet Conc.[d] | Trichlor. Outlet Conc.[d] | TCE Outlet Conc.[d] | Perchlor Outlet Conc.[d] | Time of Operation [f] |
|---|---|---|---|---|---|---|---|---|---|---|---|---|
| 3 | 186 | 9 | 1.2 | 1690 | 340 | 80 | N.D. | N.D. | N.D. | N.D. | 2.0 | 1.30 |
| 4 | 186 | 9 | 1.1 | 1630 | 470 | 70 | N.D. | N.D. | N.D. | N.D. | N.D. | 2.40 |
| 5 | 186 | 9 | 1.0 | 1880 | 510 | 75 | — | — | — | — | — | 3.10 |
| 6 | 186 | 9 | 1.0 | 1900 | 460 | 75 | — | — | — | — | — | 3.35 |

[a]–[c]See Table I
[d]Values of >100 ppm rounded to 10 ppm.
[f]Remaining samples obtained after purging with 80/20 $N_2/O_2$ stream for 10 minutes at 44 1/hr., and heating overnight at 188° C.

The data of Table IX shows that approximately 75 percent of the vinyl chloride was removed from the inlet gas stream at the 188° C. operating temperature and about 1 percent (23° C.) relative humidity level conditions. Since the bulk volume of the 12 grams of catalyst was approximately 15 cubic centimeters, the average residence time was calculated to be about 6 seconds. Essentially no significant quantity of chlorinated hydrocarbon by-product was found in the reactor outlet stream with the possible exception of a small amount of perchloroethylene.

EXAMPLE XII

About 8.6 grams of the nickel (II) oxide catalyst of Example X was placed in a 450° C. muffle furnace for two (2) hours. The catalyst was removed from the furnace and allowed to cool for five (5) minutes in air and then placed in a dessicator until tested. The nickel oxide lost about 0.3 grams due to the heating. The catalyst (8.3 grams), which occupied about 10 cubic centimeters, was used as the catalyst bed in the apparatus described in Example II. The $C_2$-chlorinated hydrocarbon stream used was that described in Example V. The data accumulated is summarized in Table X.

the initial concentrations are higher than such reduced levels).

The above described catalysts will find particular application in reducing $C_2$-chlorinated hydrocarbons, e.g., vinyl chloride and vinylidene chloride, in air streams containing same. Thus, it is contemplated that vent discharges from enclosed work areas in polyvinyl chloride producing facilities, vinyl chloride storage tank facilities, $C_2$-chlorinated hydrocarbon production facilities, etc. can be treated to reduce the concentration of such $C_2$-chlorinated hydrocarbons apprciably by the present invention.

The concentration of $C_2$-$C_4$ chlorinated hydrocarbons in gas streams containing same, e.g., air streams, can vary. Commonly, the concentration in air streams will be below or above the explosive range. For example, the concentration of vinyl chloride in air streams is typically maintained below 4 weight percent. It is contemplated therefore that the present process will find application to air streams that contain less than 4, e.g., less than 1 weight percent vinyl chloride. Further, the present process is useful for incineration of vinyl chloride at even low concentration levels, e.g., less than 0.05 weight percent. (500 ppm) and even less than 0.01

TABLE X

| Sample No. | Inlet[a] Temp. | Total[b] Flow Rate | % Rel.[c] Humid. | VCM Conc.[d] Inlet | VCM Conc.[d] Outlet | VDCM conc.[d] Inlet | VDCM conc.[d] Outlet | MC Conc.[d] Inlet | MC Conc.[d] Outlet | Trichlor. Conc.[d] Inlet | Trichlor. Conc.[d] Outlet | Perchlor. Conc.[d] Inlet | Perchlor. Conc.[d] Outlet | Time of[e] Operation |
|---|---|---|---|---|---|---|---|---|---|---|---|---|---|---|
| 1 | 104[f] | 22 | 2.5 | 10.0 | 7.5 | 9.0 | 19.5 | 27.0 | 9.0 | 17.0 | N.D. | 7.5 | 4.5 | 0.45 |
| 2 | 103[f] | 22 | 2.0 | 10.0 | 9.0 | 9.0 | 23.5 | 27.0 | 11.5 | 17.0 | 3.0 | 7.5 | 7.0 | 1.65 |
| 3 | 150[g,h] | 22 | 10.5 | 8.5 | 6.0 | 8.5 | 16.0 | 27.5 | 1.5 | 18.5 | 0.5 | 6.5 | 5.5 | 0.65 |
| 4 | 152[g,h] | 44[i] | 2.8 | 9.0 | 8.5 | 9.5 | 30.5 | 31.5 | 8.5 | 22.5 | 7.0 | 10.5 | >9.5 | 1.85 |

[a]–[c]See Table I.
[d]All concentrations in ppm. N.D. denotes Not Detected, <0.4. All values rounded to 0.5 ppm. MC = methylchloroform; VCM = vinyl chloride; VDCM = vinylidene chloride; Trichlor = trichloroethylene; Perchlor = perchloroethylene.
[e]Approximate total time of operation in hours under the set of conditions specified.
[f]Samples obtained at a reactor temperature of 108° C.
[g]Samples obtained after 1) passing 80/20 $N_2/O_2$ stream through catalyst bed for one hour at 44 liters/hour, and 2) allowing catalyst bed to heat at 108° C. overnight without flow, and 3) heating catalyst bed to 150° C. for 19 minutes prior to introducing flow containing chlorinated hydrocarbons.
[h]Samples obtained at a reactor temperature of 150-151° C.
[i]Sample obtained 21 minutes after increasing total flow rate.

The data of Table X show that the catalyst retained a moderate degree of activity, at least for a limited time, despite having been heated at 450° C. for two (2) hours prior to use. The dats also show that lower operating temperatures than 450° C. are required for maximum performance with that particular nickel (II) oxide and the utility of catalyst water of hydration.

The above examples demonstrate that hydrated nickel oxide exhibits catalytic activity at temperatures of from about 50° C. to about 450° C., respecting inciners ation of $C_2$-halogenated, e.g., chlorinated, hydrocarbons such as vinyl chloride, vinylidene chloride, methyl chloroform, etc. Further, the examples demonstrate that the $C_2$-chlorinated hydrocarbon content of a gas stream containing same can be reduced from the concentrations present in the gas stream to lower levels, e.g., less than 10 ppm, preferably less than 5 ppm (when weight percent (100 ppm). As the Examples illustrate, incineration of vinyl chloride and vinylidene chloride occurs even at concentrations less than 100 ppm, e.g., 50 ppm and 5 ppm respectively. Thus the range of vinyl chloride concentrations can vary from about 0.0005 (5 ppm) to 4 weight percent, e.g., from about 0.001 (10 ppm) to 0.1 (1000 ppm), more usually from 0.001 to .05 weight percent. With good ventilation, a range of from 0.001 (10 ppm) to 0.01 (100 ppm) weight percent vinyl chloride can be obtained. The aforesaid levels are considered applicable to the other $C_2$-$C_4$ chlorinated or brominated hydrocarbons described herein or combinations of such chlorinated hydrocarbons in gas streams.

In one application of the present invention, it is contemplated that vent gas streams containing $C_2$-$C_4$-chlorinated hydrocarbons such as vinyl chloride, e.g., vinyl chloride-containing air streams, will be dried to a low relative humidity, i.e., less than 5 percent, preferably less than about 2 percent, by absorption, adsorption, compression, cooling or compression and cooling. A simple and effective means for drying such a gas stream is to pass the gas through a drying column containing a solid or liquid desiccant, examples of which were previously described. The dried gas stream is then preheated to about 100° C.–200° C. by low pressure waste stream and introduced into a catalyst bed, e.g., fixed or fluid, containing the metal oxide catalyst of the present invention. The bed can also be heated by the low pressure waste stream. The effluent gas from the reactor can be scrubbed by conventional techniques to remove by-product hydrogen chloride gas, e.g., in a caustic scrubber, and the innocuous effluent gas from the scrubbing means utilized discharged in an environmentally acceptable manner.

It is also contemplated that the nickel oxides of the present invention can be used in protective breathing devices for individuals, e.g., a gas mask. The nickel oxides of the present invention may provide the time required for an individual to leave safely a contaminated area and reach a safety zone, i.e., a non-contaminated area. It is contemplated that any conventional gas mask can be modified to include an additional layer of the nickel oxides of the present invention or such oxides can replace a catalytic material already contained in the gas mask.

Typically, a gas mask comprises a cannister assembly (cylindrical or rectangular) having side walls, a lower lid and an upper lid at opposite ends of the cannister which are sealed to the cannister assembly by O-rings or other suitable sealing means. The lids contain air inlet and outlet means. Within the cannister are a plurality of spaced, parallel screen assemblies between which are layers of adsorbents and catalysts to remove objectionable vapors from the air passing through the cannister. Typically the first layer with which the incoming air is contacted is an activated charcoal followed by at least one layer of desiccant, e.g., caustic soda fused on pumice stone, fused calcium chloride, etc. Next, there can be placed the hydrated nickel oxide of the present process for the catalytic incineration of $C_2$–$C_4$ chlorinated or brominated hydrocarbon followed by a protective layer of desiccant to protect the nickel oxide against moisture reaching it from above. Typically, the individual layers of adsorbents and catalysts are separated by parallel wire screens which often contain filters, e.g., cotton wool filters. The air inlet conduit contains a check valve to allow air to pass in one direction, i.e., inwardly, and a filter to remove suspended solids included in the air intake. The air outlet is connected to a mouthpiece by means of nipple means attached to the cannister and inhalation hose means. The mouthpiece can also be provided with one way air discharge means for removing exhaled air from the wearer of the mask.

Although the present process has been described with reference to specific details of certain embodiments thereof, it is not intended that such details should be regarded as limitations upon the scope of the invention except as and to the extent that they are included in the accompanying claims.

We claim:

1. A method for treating a $C_2$–$C_4$ halogenated hydrocarbon containing gas stream, said halogenated hydrocarbon being selected from the group consisting of chlorinated and brominated hydrocarbons, which comprises contacting the gas stream with an oxidizing amount of oxygen-containing gas in the presence of hydrated nickel oxide catalyst at temperatures within the range of from 20° C. to 500° C., for a time sufficient to reduce said halogenated hydrocarbon content of the gas stream, said temperature being such as to inhibit water induced loss of catalyst activity.

2. The method of claim 1 wherein the halogenated hydrocarbon is $C_2$-chlorinated hydrocarbon selected from vinyl chloride, vinylidene chloride, ethylene dichloride, 1,1,1-trichloroethane, 1,1,2,-trichloroethane, trichloroethylene, perchloroethylene or mixtures of such $C_2$-halogenated hydrocarbons.

3. The method of claim 1 wherein the gas stream is an air stream.

4. The method of claim 3 wherein the gas stream contains from 0.0005 to 0.05 weight percent halogenated hydrocarbon.

5. The method of claim 1 wherein the temperature is from 50° C. to 300° C.

6. The method of claim 1 wherein the hydrated nickel oxide is selected from the group nickel (II) oxide and nickel (II, III) oxide.

7. The method of claim 1 wherein the relative humidity of the combined gas streams contacting the catalyst is less than 5 percent.

8. The method of claim 7 wherein the relative humidity is less than about 2 percent.

9. The method of claim 6 wherein the hydrated nickel oxide contains water of hydration in an amount at least as high as that obtained by drying an aqueous filter cake of precipitated nickel oxide at 225° C.

10. A method for reducing the $C_2$-chlorinated hydrocarbon content of a $C_2$-chlorinated hydrocarbon-containing air stream, which comprises contacting said air stream with an oxidizing amount of oxygen in the presence of hydrated nickel oxide catalyst at temperatures within the range of from 20° C.–500° C. for a time sufficient to reduce said $C_2$-hydrocarbon content of the air stream said temperature being such as to inhibit water induced loss of catalyst activity.

11. The method of claim 10 wherein the chlorinated hydrocarbon is vinyl chloride, vinylidene chloride, ethylene dichloride, 1,1,1-trichloroethane, 1,1,2-trichloroethane, trichloroethylene, perchloroethylene, or mixtures of such chlorinated hydrocarbons.

12. The method of claim 10 wherein the chlorinated hydrocarbon contains from 2 to 3 chlorine atoms.

13. The method of claim 11 wherein the hydrated nickel oxide is nickel (II) oxide or nickel (II, III) oxide.

14. The method of claim 13 wherein the temperature is from about 100° to about 200° C.

15. The method of claim 13 wherein the relative humidity of the combined gas streams contacting the catalyst is less than 5 percent.

* * * * *